W. P. LAMAR.
TYPE WRITING MACHINE.
APPLICATION FILED JULY 26, 1915. RENEWED OCT. 1, 1918.

1,302,181.

Patented Apr. 29, 1919.
3 SHEETS—SHEET 1.

Witnesses
G. H. Baker
H. P. Jennings

Inventor
William P. Lamar
by Foster Freeman Watson Cort
Attorney

W. P. LAMAR.
TYPE WRITING MACHINE.
APPLICATION FILED JULY 26, 1915. RENEWED OCT. 1, 1918.
1,302,181.   Patented Apr. 29, 1919.
3 SHEETS—SHEET 2.
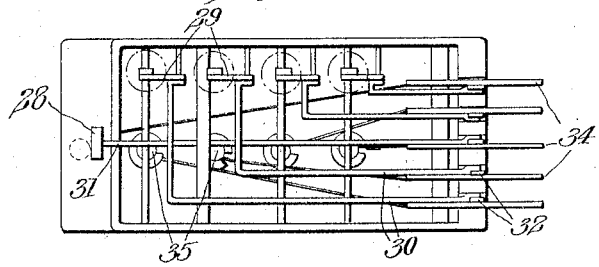
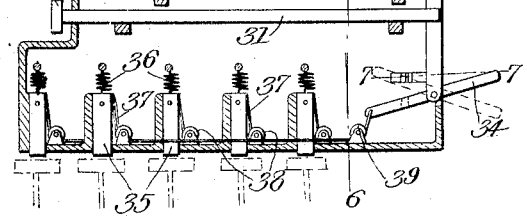
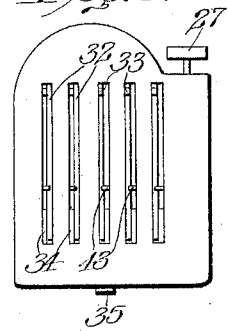
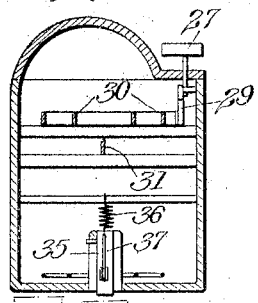
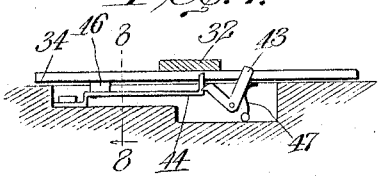

W. P. LAMAR.
TYPE WRITING MACHINE.
APPLICATION FILED JULY 26, 1915. RENEWED OCT. 1, 1918.
1,302,181.
Patented Apr. 29, 1919.
3 SHEETS—SHEET 3.
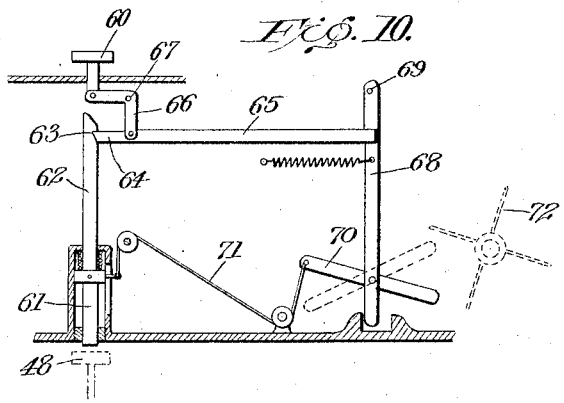
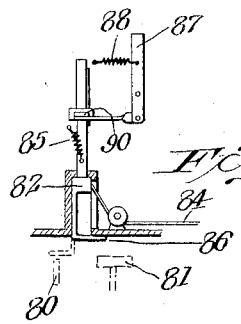
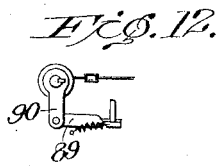
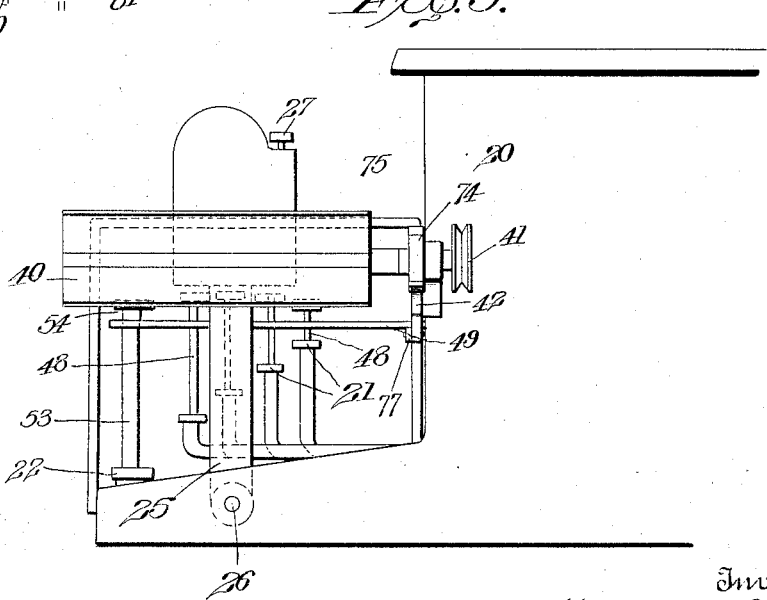
Witnesses
G. T. Baker.
H. P. Jennings.
Inventor
William P. Lamar
by Foster Freeman Watson & Cort
Attorney

UNITED STATES PATENT OFFICE.

WILLIAM P. LAMAR, OF WASHINGTON, DISTRICT OF COLUMBIA.

TYPE-WRITING MACHINE.

1,302,181.   Specification of Letters Patent.   Patented Apr. 29, 1919.

Application filed July 26, 1915, Serial No. 41,971. Renewed October 1, 1918. Serial No. 256,469.

*To all whom it may concern:*

Be it known that I, WILLIAM P. LAMAR, a citizen of the United States, and resident of Washington, District of Columbia, have invented certain new and useful Improvements in Type-Writing Machines, of which the following is a specification.

This invention relates to improvements in typewriting machines and is adapted for use either as a permanent part of the machine or as an attachment or accessory. The object of the invention is to supply mechanism which will permit of more rapid manipulation of the keys with less exertion than is now necessary in ordinary writing. In the use of the apparatus the real work of striking the blow which makes the impression is accomplished by power mechanism released by the key action.

The invention will be more particularly described in connection with the accompanying drawings, in which, Figure 1 is a plan view of the keyboard of a typewriting machine with my improvements applied thereto;

Fig. 3 is a vertical section through one of the shiftable devices carrying the operating keys partly on the line 3—3 of Fig. 1;

Fig. 4 is a plan view of the mechanism shown in Fig. 3, the top of the casing being removed;

Fig. 5 is an end view of the devices shown in Figs. 3 and 4;

Fig. 6 is a section on the line 6—6 of Fig. 3;

Fig. 7 is a section on the line 7—7 of Fig. 3;

Fig. 8 is a section on the line 8—8 of Fig. 7;

Fig. 9 is a right side elevation of the mechanism shown in Figs. 1 and 2;

Fig. 10 is a partial view illustrating a modification;

Figs. 11 and 12 are details of the arrangement shown in Fig. 10.

Figure 1:
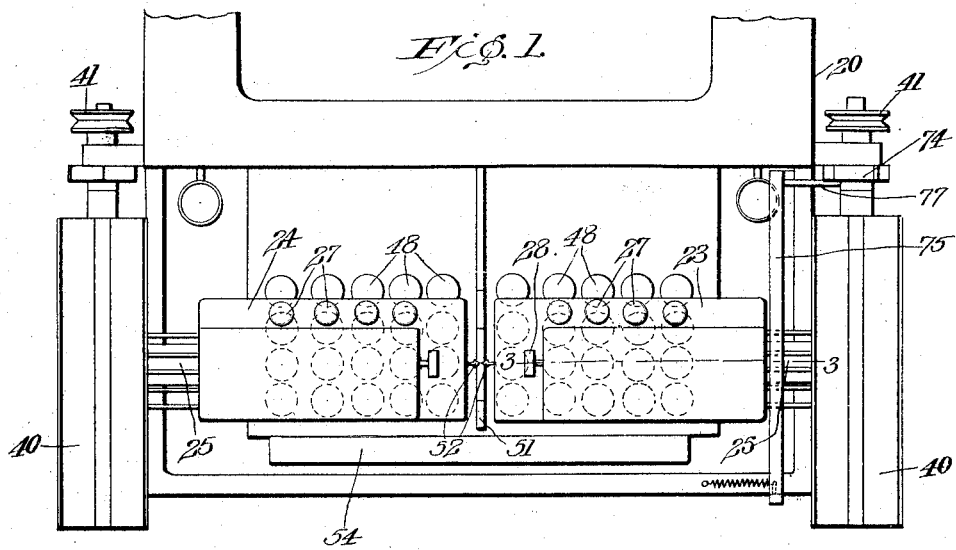

Referring to the drawings, 20 indicates a frame of a typewriting machine, 21 the usual operating keys, termed the "keyboard" and 22 the space key.

The devices constituting my invention are chiefly contained within two casings 23, 24, which are arranged over the keyboard, being each carried by a lever 25 pivotally connected at 26 with the base of the machine. The casings 23, 24 and their contained mechanism are exactly alike, excepting that there is a reversal in the arrangement of their contained devices and I shall limit the description to the right hand casing 23 and its connected parts. This casing is in the form of a handle, or a rest for the right hand. In the operation of the machine right and left hands rest on and control the casings 23, 24, and operate the typewriter through the medium of four finger keys and a thumb key on each casing. The finger keys are indicated by 27 and the thumb key by 28. Each of the finger keys is connected to an elbow lever 29 pivotally connected to the casing and to a slide 30. The slides are parallel and are suitably supported and guided. The thumb key is connected to a similar slide 31, which, as shown, is centrally arranged with respect to the slide 30. Each of the slides 30 is forked at its free end and within the fork rests a lever 32 pivoted to the casing at 33 and depending therefrom. Each lever 32 carries at its lower end an operating lever 34, the function of which will be presently described.

The casings 23, 24, may be moved back and forth over the keyboard. Each casing carries five strikers 35 for depressing the keys of the keyboard. In the form shown in Figs. 1 to 9 inclusive, the strikers are normally held in upper positions by springs 36 and to the upper end of each striker is connected a cord 37 which passes around pulleys 38, 39, and is connected to the inner end of its corresponding lever 34. When one of the keys 27 is depressed it rocks a lever 29, moves outward a slide 30 which rocks the depending lever 32, swinging the lever 34 outward until its outer end is in the path of the paddles of a paddle wheel 40, which is arranged along the side of the keyboard. The paddle wheel is constantly under tension to turn which may be imparted to it, for instance, by a belt slipping over a pulley 41. It is restrained from turning by a pawl 42, which pawl is rocked by the outward movement of the bar 30 or the lever 32, permitting the paddle wheel to make a quarter turn for each key that is operated. When the paddle wheel is released one of the paddles strikes the lever 34 which has been operated, throwing it down from the full line position to the dotted line position, Fig. 3, and the lever operating through its corresponding cord, operates a striker which in turn operates the selected key of the typewriter causing a printing stroke of the type bar.

In order to prevent an incomplete stroke of the type bar due to releasing the keys 27 or 28 too quickly, I prefer to lock the selected lever 32 in its outward position until the corresponding lever 34 has been fully operated by the paddle wheel. As shown in Fig. 7, the lever 32 when moved outward will rock a latch lever 43 and release a spring stop 44 which will spring in behind the lever 32 and prevent it from returning until the lever 34 has made a full stroke and properly operated the selected type bar. As the lever 34 completes its stroke and reaches the dotted position, Fig. 3, a cam or wedge 45 (Fig. 8) will coöperate with a similar cam or wedge 46 on the spring latch 44 and spring the engaging end of the latch 44 away from the lever 32, permitting said lever to return to its normal position, in which position the lever 34 is held away from the paddle wheel. The latch 43 engages the latch spring 44 and retains it until the lever 32 is again moved forward, being assisted in this action by a spring 47 (Fig. 7).

Figure 2:
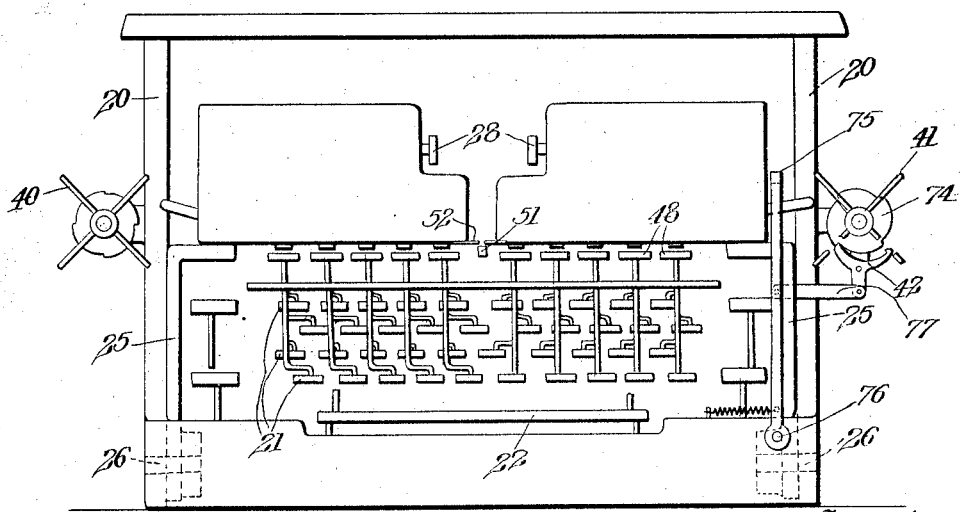
Fig. 2 is a front elevation of the same.

The ordinary keys of a typewriter keyboard are not suitably arranged for operation by the devices above described and I therefore supply connections which are interposed between the strikers 35 and the keys 21 and which may be termed "interponents". As shown in Figs. 2 and 9, the interponents or supplemental keys 48 have stems which are mounted in a plate 49 and which rest on the typewriter keys 21. These stems are of different length so that their tops are substantially on a level, but preferably arranged in the arc of a circle drawn about the pivot line 26 so that the tops of all of the interponents are equally distant from the strikers 35. The interponents have key tops which are arranged in rows from front to rear and laterally, in rectangular arrangement, which is better suited for the operation of my devices than the diagonal arrangement of the typewriter keyboard and to accomplish this rectangular arrangement the lower parts of the interponent stems are offset, as may be necessary, so as to rest on their corresponding keys.

In operation the hands are permitted to rest on the casings 23 with the fingers on the respective keys 27 and the thumbs in position to operate the keys 28. The casings 23 are freely movable back and forth over the keyboard and to print any particular type the proper casing is moved until the row of strikers, which is centrally arranged in the casing, is over the line of keys of the keyboard in which the desired key is located. This adjustment of the hand devices will be made rapidly and unerringly by a little experience without the use of an index or scale, but for the convenience of beginners I provide a scale 51 (Fig. 1) and arrange an indicator 52 on each casing. The scale 51 is provided with four marks which indicate the four positions in which the strikers are over the four lines of the supplemental keys 48, corresponding to the four lines of keys of the keyboard. Having positioned the casing 23 the proper key 27 is depressed, operating to print the type in the manner heretofore described. The impression of the key requires but very slight effort as it simply has to swing the lever 32 to carry the lever 34 into position to be struck by the paddle wheel. The real work of printing is accomplished by power transmitted through the paddle wheel. The operator is so relieved from the effort of striking the blow to print the type and from having to move the hands over the keyboard laterally, that much more rapid work can be accomplished than in operating a machine in the ordinary manner. The hands rest on the casings 23 continuously and it is only necessary to move the arms very slightly to shift the casings back and forth and to press the necessary keys on the casings.

To operate the space key 22 I provide upward extensions 53 having a bar or supplemental space key 54, as shown in Figs. 1 and 9. The space key may be operated by any one of the finger or thumb keys by simply moving the hand devices 23, 24, forward to the proper position.

In the form of my invention heretofore described the strikers are impelled to move the keys of the machine by the paddle wheel and are returned to normal position by springs. It is within the scope of my invention to reverse this arrangement and in Fig. 10 I have shown mechanism embodying such reversal. Referring to this figure 48 represents one of the supplemental key levers and 60 one of the finger keys of the shifting hand-operating devices. The striker 61 has an upward extension 62 provided with a notch 63 which is engaged by the end 64 of a slide 65. The slide 65 is operated by an elbow lever 66 pivoted to the casing at 67, to which elbow lever the key 60 is also pivotally connected. The slide 65 is suitably guided in the casing and it operates a lever 68 which is pivotally connected to the casing at 69. The lower end of the lever carries a cross lever 70, the inner end of which is connected through a cord 71 to the striker 61. When the paddle wheel 72 strikes the lever 70 it moves it from the dotted position to the full line position (Fig. 10) drawing the striker up to the position shown in which it is engaged by the slide 65. Whenever the corresponding key is operated the striker is instantly released and moves down upon the key 48, operating the corresponding type bar, and immediately thereafter the paddle wheel, which is power operated, strikes the lever 70 and draws the striker up until it is again held by the latch 64.

Referring to Figs. 11 and 12, I have shown a device by means of which a space key 80 may be operated by the same striker that operates a type key 81. The striker 82 is drawn down by a cord 83 operated from a paddle wheel, as described in connection with Figs. 1 to 9 inclusive, the striker being normally raised by a spring 85. The striker has a lateral extension 86 at its lower end, the normal position of which is over the key 81. When it is desired to have the striker operate on the space key 80, a lever 87 is pressed to one side against the tension of a spring 88 and through connections 89 and 90, and it turns the striker until the lip or extension 86 is moved over the space key, as indicated in dotted lines in Fig. 11.

In Figs. 1, 2 and 9 I have illustrated one means of operating the escapement pawl 42 to release the paddle wheel. The paddle wheel and its ratchet wheel 74 are constantly under a tension to move in a direction to operate the printing mechanism. The paddle wheel, however, is restrained by the pawl 42 as indicated in Fig. 2. This pawl is connected by link 77 to a bail 75 which is pivoted at its front and rear ends to the frame of the machine on the axial line 76. When a key 27 is operated the corresponding lever is moved outward and operates the bail 75 rocking the pawl 42. This permits the paddle wheel to make a quarter revolution and the parts are restored to normal position as soon as the key 27 is released.

Having described my invention what I claim and desire to be secured by Letters-Patent is, 1. The combination with a typewriting machine having a keyboard, of devices movable over the keyboard and each provided with a plurality of keys less in number than the keys of the keyboard, and connections whereby any key of the keyboard may be operated by said devices.

2. The combination with a typewriter having a keyboard, of two devices movable over the keyboard and each provided with a set of keys less in number than the keys of the keyboard, and means whereby the typewriter may be operated by power released by the keys of said devices.

3. The combination with a typewriter having a keyboard, of right and left hand devices movable over the keyboard and each provided with finger keys less in number than the keys of the keyboard and power operated means releasable by the keys of said devices to effect printing by the typewriter.

4. The combination with a typewriting machine having a keyboard, of interponents resting on the keys of the keyboard, the upper ends of said interponents being in rectangular arrangement, and hand operated devices movable over the interponents and adapted to operate them at will.

5. The combination with a typewriting machine having a keyboard, of interponents resting on the keys of the keyboard, the upper ends of said interponents being in rectangular arrangement, and hand operated devices movable over the interponents and adapted to operate them at will, said hand operated devices being arranged to release power operated devices to move the interponents and the keys upon which they rest and effect printing.

6. The combination with a typewriting machine having a keyboard of two hand operated devices pivotally connected at the right and left sides of the keyboard and provided with finger keys, paddle wheels arranged at the sides of the keyboard, means operated by the finger keys for releasing the paddle wheels, and means operated by the paddle wheels for striking the keyboard and causing the type to print.

In testimony whereof I affix my signature.

WILLIAM P. LAMAR.

Copies of this patent may be obtained for five cents each, by addressing the "Commissioner of Patents, Washington, D. C."